US011005397B2

(12) United States Patent
Boscolo Berto

(10) Patent No.: US 11,005,397 B2
(45) Date of Patent: May 11, 2021

(54) METHOD OF DETECTING THE ANGULAR POSITION OF AN ELECTRIC MOTOR, CORRESPONDING CIRCUIT AND ELECTRIC MOTOR

(71) Applicant: STMicroelectronics S.r.l., Agrate Brianza (IT)

(72) Inventor: Michele Boscolo Berto, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 10 days.

(21) Appl. No.: 16/685,544

(22) Filed: Nov. 15, 2019

(65) Prior Publication Data
US 2020/0195177 A1    Jun. 18, 2020

(30) Foreign Application Priority Data
Dec. 13, 2018  (IT) .......................... 102018000011061

(51) Int. Cl.
*H02P 6/185* (2016.01)
(52) U.S. Cl.
CPC .......... *H02P 6/185* (2013.01); *H02P 2209/03* (2013.01)
(58) Field of Classification Search
CPC ............................. H02P 2209/03; H02P 6/185
See application file for complete search history.

(56) References Cited

U.S. PATENT DOCUMENTS

| | | | | |
|---|---|---|---|---|
| 4,978,895 A * | 12/1990 | Schwarz | ................... | H02P 6/18 318/400.04 |
| 6,841,903 B2 * | 1/2005 | Boscolo | ................. | G11B 19/20 310/68 B |
| 8,040,095 B2 | 10/2011 | Berto | | |
| 8,970,150 B2 * | 3/2015 | Boscolo | ................. | H02P 6/185 318/400.33 |
| 8,994,306 B2 * | 3/2015 | Kobayashi | .............. | H02P 6/185 318/400.33 |
| 9,525,371 B2 * | 12/2016 | Boscolo Berto | ........ | H02P 27/08 |
| 2018/0159451 A1 | 6/2018 | Boscolo Berto et al. | | |

* cited by examiner

*Primary Examiner* — Thai T Dinh
(74) *Attorney, Agent, or Firm* — Slater Matsil, LLP

(57) ABSTRACT

A method for detecting the angular position of an electric motor includes: applying a first drive signal with a first polarity between first and second drive terminals that are coupled to respective stator windings of the electric motor; sensing at a third drive terminal a first signal resulting from the application of the first drive signal; applying a second drive signal with a second polarity between the first and second drive terminals, the second polarity being opposite the first polarity; sensing at the third drive terminal a second signal resulting from the application of the second drive signal; and producing a sum signal by summing the first and second signals, wherein the sum signal is indicative of an angular position of a rotor of the electric motor with respect to the stator windings.

20 Claims, 9 Drawing Sheets

METHOD OF DETECTING THE ANGULAR POSITION OF AN ELECTRIC MOTOR, CORRESPONDING CIRCUIT AND ELECTRIC MOTOR

CROSS-REFERENCE TO RELATED APPLICATIONS

This application claims priority to Italian Application No. 102018000011061, filed on Dec. 13, 2018, which application is hereby incorporated herein by reference.

TECHNICAL FIELD

The present disclosure relates generally to an electronic system and method, and, in particular embodiments, to method of detecting the angular position of an electric motor, corresponding circuit and electric motor.

BACKGROUND

Multi-phase brushless DC motors, e.g., three-phase brushless DC motors, are known in the art and may be employed, for instance, as spindle motors in hard disk drives, CD/DVD drives and similar devices. Spindle motors are typically used in such hard disk drives and CD/DVD drives in order to spin the disk where data is stored.

A known technical issue of spindle motors relates to detecting, e.g., identifying, the angular position of the rotor with respect to the stator. Detecting the relative position between the rotor and the stator may be relevant, for instance, for improving the start-up procedure of a spindle motor.

Imprecise detection of the position of the rotor in a brushless DC (BLDC) motor may in fact result in erroneous activation of a start-up procedure, e.g., with application of an imprecise or wrong excitation sequence of the stator windings. In turn, this may result in an efficiency drop or, in some cases, in a failure of the start-up procedure of the electric motor (e.g., loss of synchronism).

Methods of detecting the position of the rotor in a BLDC motor may thus involve high performance, particularly with reference to improved spatial precision and/or resolution and reduced sensitivity to disturbances.

Methods of detecting the position of the rotor in a BLDC motor are known in the art. For example, "inductive sense" methods typically rely on sensing at least one current flowing through the motor windings (i.e., the stator windings) upon application of a voltage pulse thereto. The response (e.g., the shape) of the at least one sensed current signal to a certain applied voltage pulse may be used to estimate the angular position of the rotor.

In fact, the shape of such sensed current signal(s) may depend on the inductance of the stator windings. The inductance of the stator windings may in turn be affected by magnetic saturation effects due to the magnetic field generated by the permanent magnets comprised in the rotor, which generate a so-called rotor magnetic field. Thus, the relative position between the rotor and the stator may be determined based on such sensed current signal(s).

For instance, known inductive sense methods may comprise sensing a current flowing through the motor windings (also referred to as "motor current" in the present description, for the sake of brevity) as a result of a certain voltage pulse being applied to those windings, and measuring a time necessary for such current to reach a certain threshold, i.e., measuring a so-called rise-time $T_{rise}$.

SUMMARY

The inventors have noted, however, that such known methods may result in satisfactory performance only if the back electromotive force(s) (BEMF) across the motor windings are null or very small (e.g., if the rotor is stationary or rotating at very low speed), the current flowing through the motor windings is sensed with high precision and the motor supply voltage is stable.

Other known inductive sense methods may instead involve measuring a so-called fall-time $T_{fall}$ of a motor current flowing through motor windings, i.e., the time necessary for the current to decrease from a first value to a second value smaller than the first value, e.g., as a result of the voltage applied to those windings decreasing to zero during the applied voltage pulse. In this context, document U.S. Pat. No. 9,525,371 B2 of the same Assignee is exemplary of the prior art.

Inductive sense methods involving measurement of a current fall-time $T_{fall}$ may facilitate overcoming some of the drawbacks of the methods relying on measurement of a current rise-time $T_{rise}$, but may result in a longer time for performing the current measurement, due to the motor current being discharged through a low-impedance current path (e.g., a short circuit to ground).

Various applications may benefit from an inductive sense procedure having a reduced execution time, e.g., in case the inductive sense procedure is repeated at regular time intervals for implementing a start-up procedure of a BLDC motor. Therefore, fall-time-based methods as disclosed in document U.S. Pat. No. 9,525,371 B2 may not be suitable for application in start-up procedures, while they may be advantageous in detecting the position of a stationary rotor.

Other inductive sense methods known in the art may combine rise-time and fall-time measurements of a motor current, thereby facilitating the detection of the rotor position also in case the rotor is not stationary (i.e., in case the back electromotive forces across the motor windings are not null). For instance, document U.S. Pat. No. 8,970,150 B2 of the same Assignee may be cited in this context.

The inventors have noted that such methods combining rise-time and fall-time measurements may not be yet satisfactory in case the motor current is sensed with poor precision, and/or the motor supply voltage is not stable.

Other methods of detecting the position of the rotor in a BLDC motor are known in the art, e.g., as disclosed by document U.S. Pat. No. 8,040,095 B2. Such methods may rely on measuring mutual inductance effects between the stator windings. However, the inventors have noted that such known methods may not be satisfactory in case the motor windings are unbalanced, and/or the sensing circuit is poorly decoupled from the BLDC motor.

Despite the extensive activity in the area, further improved solutions are desirable.

For instance, solutions are desirable which may provide improved inductive sense methods for detecting and/or estimating the position of the rotor in a BLDC electric motor.

Some embodiments facilitate overcoming the above-mentioned drawbacks of known inductive sense methods.

Some embodiments relate to BLDC motors such as spindle motors of the type used in hard disk drives (HDD), CD/DVD drives and similar devices.

One or more embodiments may be applied, for instance, to methods and circuits for detecting and/or estimating the position of a rotor of a BLDC motor, such methods and circuits being based on inductive sensing techniques.

Some embodiments are advantageously capable of detecting the angular position of the rotor in a BLDC motor also in cases where the back electromotive forces across the motor windings are not null, and/or the motor current is sensed with poor precision, and/or the motor supply voltage is not stable, and/or the quality of the mechanical assembly of the motor is poor (thus resulting, e.g., in unbalanced motor windings), and/or the sensing circuit is poorly decoupled from the motor (thus resulting, e.g., in bad decoupling between the motor drive terminals and the sensing circuit).

Some embodiments are advantageously capable of detecting the angular position of the rotor of a BLDC motor also in suboptimal operating conditions and for providing start-up procedures, involving repetition of an inductive sense method at regular time intervals, which are reliable and affordable.

One or more embodiments relate to a method for detecting and/or estimating the position of a rotor of a BLDC motor.

One or more embodiments relate to a corresponding circuit.

One or more embodiments relate to a corresponding motor.

In one or more embodiments, an inductive sense method may be based on elaboration and/or processing of signals sensed at floating terminals of an electric motor.

For instance, one or more embodiments may relate to a method comprising:

applying a drive signal with a first polarity between a first drive terminal and a second drive terminal of an electric motor and sensing at a third drive terminal at least one first signal resulting from the application of the drive signal with the first polarity;

applying a drive signal with a second polarity between the first drive terminal and the second drive terminal, the second polarity opposite the first polarity, and sensing at the third drive terminal at least one second signal resulting from the application of the drive signal with the second polarity; and producing at least one sum signal by summing the at least one first signal sensed and the at least one second signal sensed, wherein the at least one sum signal is indicative of an angular position of the rotor of the electric motor.

For instance, the first and second sensed signals may be sensed with a charge current and/or a discharge current flowing between the first drive terminal and the second drive terminal.

One or more embodiments may comprise detecting the polarity of the at least one sum signal, with the polarity or the changes of polarity being indicative of the angular position of the rotor of the electric motor.

In one or more embodiments, the first signal may be sensed both with a charge current and with a discharge current flowing between the first drive terminal and the second drive terminal, the same applying to the second signal, thereby producing a pair of sum signals. Such sum signals may be subtracted one from the other (e.g., in whatever order) to produce a difference signal, whose polarity or changes of polarity are indicative of an angular position of the rotor of the electric motor.

In one or more embodiments, an inductive sense procedure at a certain drive terminal may be interleaved with an inductive sense procedure at another drive terminal, thereby generating a plurality of sum and/or difference signals indicative of the position of the rotor of the electric motor.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
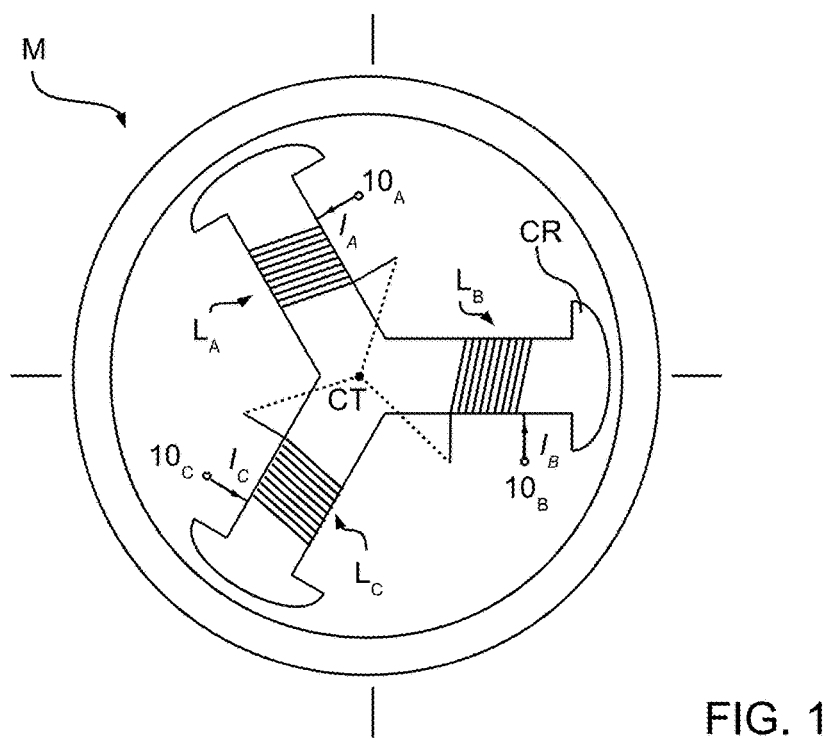
FIG. 1 is exemplary of an electric motor, particularly a brushless DC electric motor.

By way of introduction to a detailed description of exemplary embodiments, reference may be first had to FIG. 1.

FIG. 1 is a simplified diagram exemplary of an electric motor M, in particular a three-phase BLDC motor.

The electric motor M exemplified in FIG. 1 comprises three stator windings LA, LB, LC arranged in a star configuration (also called wye configuration), the stator windings LA, LB, LC being wound around a common magnetic core CR. In a star configuration, each of the stator windings LA, LB, LC has a respective first terminal 10A, 10B, 10C configured for receiving a respective drive signal (e.g., a pulse-width modulated signal) and a respective second terminal coupled to a common node CT (also called neutral point) shared by the stator windings.

Generally, the drive terminals 10A, 10B, 10C (also referred to as the "phases" of the electric motor M) are accessible externally to the motor M for coupling to a drive circuit, while the common node CT may or may not be accessible externally to the motor M (e.g., via a dedicated pin).

Currents flowing between the first terminal and the second terminal of each of the motor windings LA, LB, LC are indicated with respective references IA, IB, IC.

It is noted that reference to a three-phase electric motor M with star configuration is made in the present description by way of example only. One or more embodiments may be applied to any type of multi-phase brushless DC motor having a certain number of windings arranged in a star configuration, a delta configuration or other configurations. Generally, an N-phase brushless DC motor for use in one or more embodiments may have N drive terminals externally accessible, with the internal structure of the motor M being possibly not relevant for one or more embodiments.

In the context of the present description, possible drive configurations of the electric motor M will be referred to with designations of the type XY!, wherein the first letter (X, possibly being A, B or C) indicates a certain drive terminal which is coupled to a higher potential and the second letter (Y, possibly being A, B or C) indicates a certain drive terminal which is coupled to a lower potential.

It will be noted that the rotor of the motor M, which may comprise a set of permanent magnets, is not visible in the Figures annexed herein.

In one or more embodiments, an inductive sense procedure may involve a so-called "transformer effect," where, e.g., the inductive sense procedure may be based on the recognition that the electric behaviors of the stator windings LA, LB, LC are mutually influenced by mutual inductances.

Figure 2:
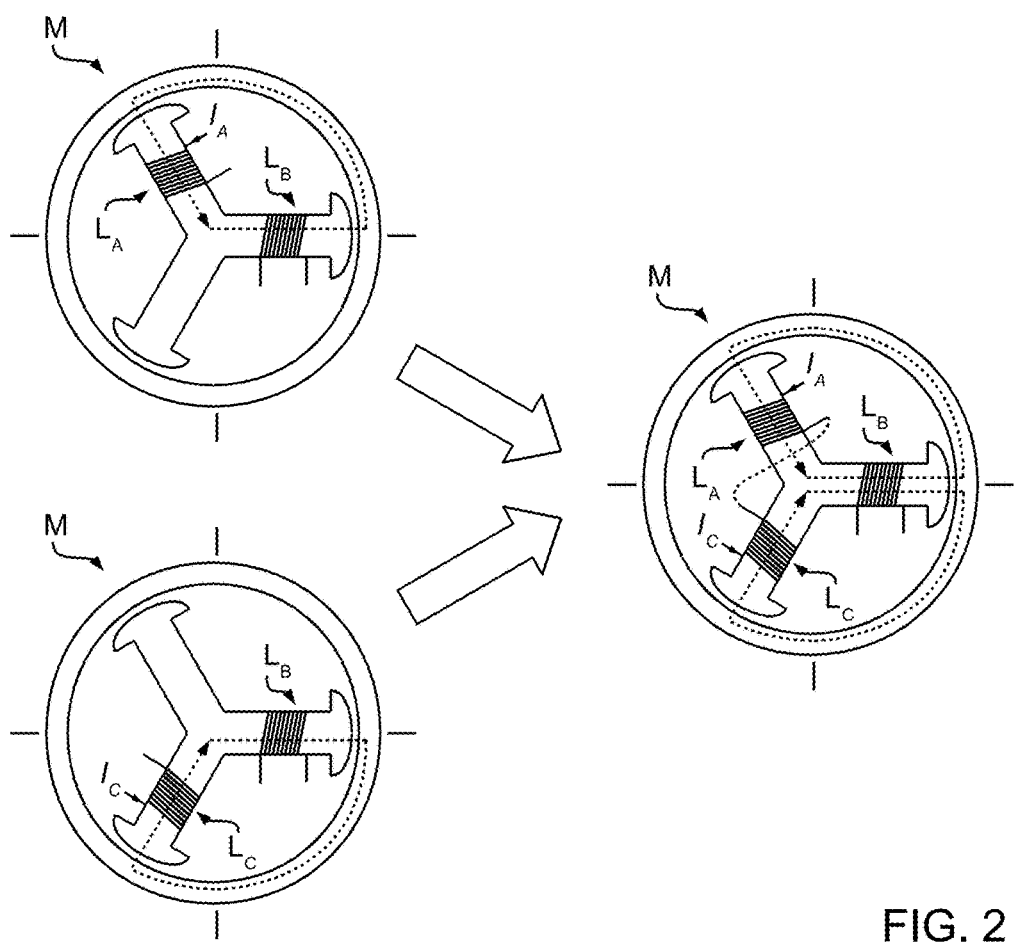
FIG. 2 is exemplary of operation of a brushless DC electric motor during an inductive sense procedure, according to one or more embodiments.

FIG. 2 is exemplary of possible operation of the electric motor M during an inductive sense procedure, according to one or more embodiments.

During an inductive sense procedure according to one or more embodiments, the electric motor M may be controlled by applying a certain voltage between two drive terminals, e.g., the drive terminals 10A and 10C. Applying such voltage thus results in a certain current flowing between those two drive terminals (e.g., 10A and 10C) through the respective stator windings (LA and LC), and bringing a third drive terminal (e.g., the drive terminal 10B) in a so-called floating state. The impedance at such third drive terminal is high and current flow through the respective winding (LB) is countered. In the context of the present description, a drive terminal being in a floating state may be referred to as a "floating phase," for the sake of brevity.

For instance, with reference to FIG. 2, the motor M is driven in configuration AC!, with a higher potential (for instance, a motor supply voltage VM) applied to the drive terminal 10A and a lower potential (for instance, a reference ground voltage) applied to the drive terminal 10C. As a result of the drive terminal 10B being in a floating state, the current IA flowing into the drive terminal 10A is approximately equal to the current IC flowing through the drive terminal 10C, i.e., little or no current flows in the winding LB and the windings LA and LC are coupled in series.

The inventors have noted that, when applying a certain voltage between two drive terminals and bringing a third drive terminal to a floating state, the electrical behavior of the motor windings LA, LB, LC may be described as a result of the operation of a set of transformers, e.g., two transformers in the exemplified case of a three-phase motor M.

For instance, in a drive configuration as exemplified in FIG. 2, the electrical behavior of the motor windings LA, LB, LC may be described as a result of the combined operation of:

a first transformer comprising the motor winding LA as primary winding and the motor winding LB as secondary winding (see, e.g., FIG. 2, top left portion); and a second transformer comprising the motor winding LC as primary winding and the motor winding LB as secondary winding (see, e.g., FIG. 2, bottom left portion).

Thus, the first and the second transformer share a common secondary winding (e.g., LB in the case exemplified herein).

In one or more embodiments, as a result of the motor M being driven in a configuration AC! as exemplified in FIG. 2, the first and the second transformer may operate at the same time, particularly with the current flowing in the windings LA and LC being equal in magnitude and having opposite sign. The combined operation of such first and second transformer may thus generate a certain output voltage across the winding LB, the output voltage across the winding LB being a combination of the output voltages of the first and second transformers.

As a result of the motor M being balanced (i.e., the stator windings having similar values of inductance and resistance, LA=LB=LC), the output voltage generated by the first transformer at the secondary winding (e.g., LB) may have approximately the same magnitude and opposite sign of the output voltage generated by the second transformer at the secondary winding (e.g., again LB). Thus, in the case of a balanced motor M, the overall output voltage generated at the secondary winding shared by the first and second transformers (e.g., LB) may be null or almost null.

In other words, the voltage sensed at a floating drive terminal while the other two drive terminals are driven in a certain excitation configuration (XY! or YX!) may be null or almost null, in case of a balanced motor M.

As a result of the motor M being unbalanced (i.e., at least one of the motor windings LA, LB, LC having an inductance and/or resistance different from the others), the output voltage generated by the first transformer at the secondary winding (e.g., again LB in the case of the configuration AC! exemplified in FIG. 2) may have an opposite sign with respect to the output voltage generated by the second transformer at the secondary winding (e.g., LB), and a different magnitude. Thus, in the case of an unbalanced motor M, the overall output voltage generated at the shared secondary winding (e.g., LB) may be different from zero.

In other words, the voltage sensed at a floating drive terminal while the other two drive terminals are driven in a certain excitation configuration (XY! or YX!) may be different from zero.

Therefore, the inventors have noted that a change of the value of inductance of any of the motor windings LA, LB, LC may generate, as a result of the motor being excited in a certain configuration via a first (X) and a second (Y) drive terminal (e.g., XY! or YX!), a certain voltage signal at a third drive terminal which is in a floating state.

Thus, since the value of inductance of any of the motor windings LA, LB, LC may be affected by magnetic saturation effects due to the magnetic field generated by permanent magnets provided in the rotor, and being the effects of the rotor magnetic field dependent on the angular position of the rotor with respect to the stator windings, the inventors have noted that the position of the rotor may be detected by sensing voltage signals at drive terminals in a floating state while applying voltage pulses at the other drive terminals, with such sensed voltage signals being dependent on the magnetic saturation of the motor windings and the mutual inductance effect between the motor windings, as discussed above.

It is noted that what has been illustrated in FIG. 2 with reference to the motor M driven in the AC! configuration, may apply to any of the possible drive configurations of a multi-phase motor M.

For instance, in a three-phase motor, a voltage may be sensed across the floating winding LB (e.g., between the floating terminal 10B and the neutral point CT) while the motor is driven in any of the AC! or CA! configurations. As another example, a voltage may be sensed across the floating winding LA while the motor is driven in any of the BC! or CB! configurations.

Moreover, it is noted that a voltage may be sensed at a certain floating terminal during a so-called current charge phase (i.e., while the motor current increases due to application of a certain voltage signal to the remaining two drive terminals), and/or during a so-called current discharge phase (i.e., while the motor current decreases due to removal of the voltage signal applied to the remaining two drive terminals).

Figure 3:
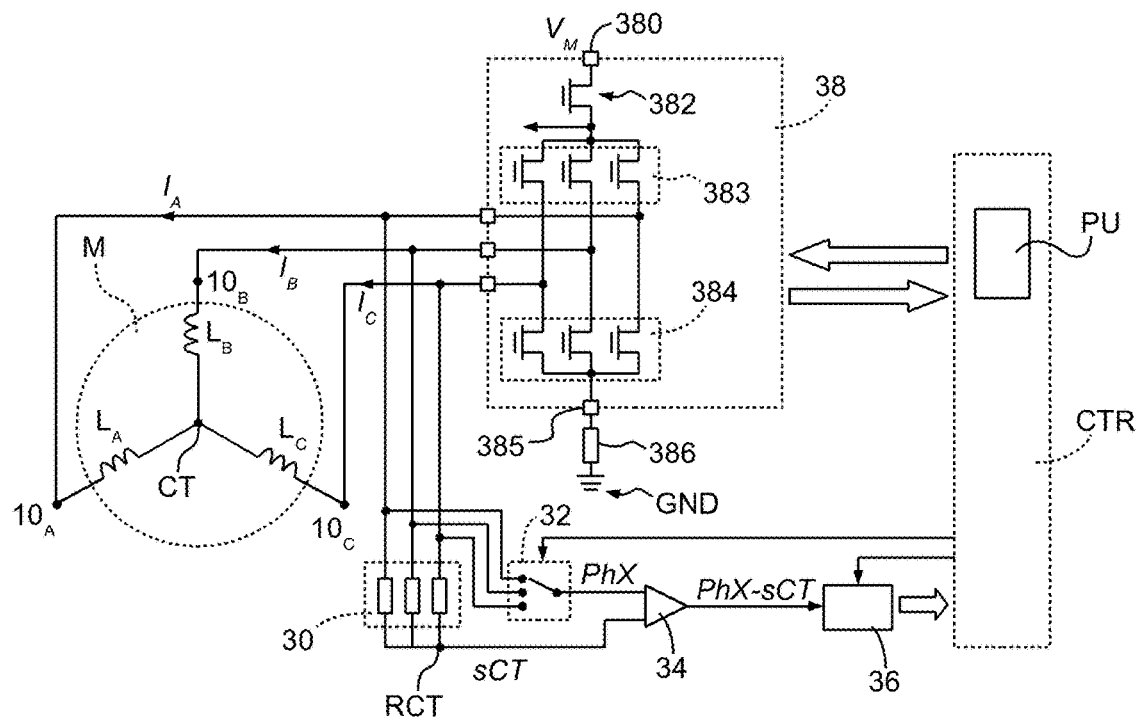
FIG. 3 is a block circuit diagram exemplary of a brushless DC electric motor and driving/sensing circuit for cooperation with the electric motor, according to one or more embodiments.

FIG. 3 is a block circuit diagram exemplary of a BLDC motor M and driving/sensing circuits for cooperation with the electric motor M, according to one or more embodiments.

In one or more embodiments, the driving/sensing circuits of the motor M may comprise:

a neutral point reconstruction circuit 30 configured to be coupled to the drive terminals 10A, 10B, 10C of the motor M to provide at an output node RCT (also called reconstructed neutral point) a (voltage) signal sCT indicative of the (voltage) signal at the common node CT;

a driver circuit 38 configured to be coupled to the motor drive terminals 10A, 10B, 10C of the motor M to provide thereto respective drive signals for operation of the motor M;

a sensing circuit 32, 34, 36 configured to sense (voltage) signals at the motor drive terminals 10A, 10B, 10C (e.g., configured to sense voltage signals across motor windings being in a floating state); and a control circuit CTR configured to control operation of the driver circuit 38 and of the sensing circuit 32, 34, 36.

In particular, in one or more embodiments a neutral point reconstruction circuit 30 may comprise N resistors (N being the number of phases of the motor M). For example, in an embodiment with three phases, the neutral point reconstruction circuit 30 may comprise three resistors. Each of the N resistors has a first terminal coupled to a respective drive terminal of the motor M, and a second terminal coupled to a common output node RCT. The N resistors may have (approximately) the same ohmic value.

Therefore, in one or more embodiments, a neutral point reconstruction circuit 30 may comprise a node RCT that provides a replica of the voltage signal at node CT. The node RCT providing a replica of the voltage signal at node CT may be particularly advantageous for use in embodiments where a connection between the sensing circuit 32, 34, 36 and the node CT may not be possible or may not be cost-effective.

In particular, in one or more embodiments the driver circuit 38 may comprise:

a pair of terminals 380 and 385, the terminal 380 configured to receive a motor supply voltage VM and the terminal 385 configured to be coupled (directly or indirectly) to a reference (ground) node GND; and a set of drive signal generation paths between the terminals 380 and 385 (e.g., three drive signal generation paths) configured to generate the drive signals for provision to the drive terminals 10A, 10B, 10C.

In one or more embodiments, each of the drive signal generation paths in the driver circuit 38 may comprise a respective high-side electronic switch (e.g., transistors 383 in FIG. 3) and a respective low-side electronic switch (e.g., transistors 384 in FIG. 3) arranged in a half-bridge configuration between the terminals 380 and 385, with the respective drive signal being generated at a respective node intermediate the high-side electronic switch and the low-side electronic switch.

Such electronic switches may comprise, for instance, transistors (e.g., MOS transistors or BJT transistors) or any other type of electronic switch.

In one or more embodiments, the driver circuit 38 may be additionally (and optionally) configured to sense at least one current flowing through at least one of the motor windings LA, LB, LC.

Thus, the driver circuit 38 may comprise a current sensing transistor 382 (e.g., an ISOFET Sensefet) coupled in series with the set of drive signal generation paths (e.g., coupled between the terminal 380 and the set of high-side electronic switches 383), the current sensing transistor 382 being configured to sense the current flowing between the terminal 380 and ground, through the motor windings.

Additionally or alternatively, in one or more embodiments the low-side transistors 384 may be sensefets configured to sense a current flowing through the respective drive signal generation path, and through the respective motor winding.

Additionally or alternatively, the driving/sensing circuits of the motor M may comprise a current sensing circuit 386 configured to be coupled in series with the set of drive signal generation paths (e.g., between the terminal 385 and the ground node GND) to sense the current flowing between the terminal 380 and ground and through the motor windings. In particular, the current sensing circuit 386 may comprise a sense resistor Rsense couplable externally to the integrated circuit, e.g., by using dedicated pins/terminals.

It will be noted that the current sensing transistor 382, the set of low-side sensefets 384, and the current sensing circuit 386, are configured for sensing the current flowing in the motor windings. Thus, such circuit components may be comprised as alternatives in one or more embodiments, i.e., one or more embodiments may not comprise one or more of the current sensing transistor 382, the set of low-side sensefets 384, and the current sensing circuit 386.

Also, it is noted that the current sensing devices described above (382, 384, 386) may not be present in one or more embodiments, e.g., since one or more embodiments, may operate without performing a current sensing function (thus, e.g., facilitating providing cost-effective solutions).

In one or more embodiments, the control circuit CTR may be configured to control the driver circuit 38 to generate drive signals for the motor M. For instance, the drive signals may result in excitation of the motor windings according to one or more of the possible drive configurations (e.g., CB!, AB!, AC!, BC!, BA!, CA!).

Additionally, the control circuit CTR may be configured to drive cyclically the motor M through a certain sequence of possible drive configurations.

In one or more embodiments, the control circuit CTR may be configured to control the sensing circuit to:

select, e.g., by using a multiplexer (MUX) 32, a drive terminal (e.g., 10A) amongst the drive terminals 10A, 10B, 10C for voltage sensing, the selected drive terminal being possibly brought to a floating state;

compare, e.g., by using a differential circuit 34 (e.g., an operational amplifier), the (voltage) signal PhX at the selected drive terminal to the (voltage) signal sCT at node RCT, thereby generating an analog output signal PhX-sCT at the output of the differential circuit 34, the signal PhX-sCT being indicative of the (voltage) signal across the motor winding coupled to the selected drive terminal (e.g., LA); and convert, e.g., by using an analog-to-digital converter (ADC) 36, the analog output signal PhX-sCT to a digital signal indicative of the (voltage) signal across the motor winding coupled to the selected drive terminal (e.g., LA), with such digital signal being provided to the control circuit CTR, and possibly stored and/or processed therein.

In one or more embodiments, an inductive sense procedure may comprise driving the motor M according to a certain sequence of driving configurations (e.g., the sequence CB!, AB!, AC!, BC!, BA!, CA!) corresponding to ON phases of the motor M.

Possibly, the motor M may be driven to OFF for a certain time period between each of the subsequent driving phases of the sequence. The motor M being driven to OFF means that the driver circuit 38 is driven so as to result in a discharge of the current flowing through the motor windings.

Therefore, each of the driving configurations (CB!, AB!, AC!, BC!, BA!, CA!) may correspond to a certain current charge phase, with the subsequent OFF phase corresponding to a current discharge phase.

In one or more embodiments, a voltage may be sensed at a floating terminal during each of the driving configurations of the sequence and/or during the subsequent OFF time, with the floating terminal being selected by using the multiplexer 32. In particular:

during or after the configuration CB!, a voltage may be sensed at the drive terminal $10_A$;

during or after the configuration AB!, a voltage may be sensed at the drive terminal $10_C$;

during or after the configuration AC!, a voltage may be sensed at the drive terminal $10_B$;

during or after the configuration BC!, a voltage may be sensed at the drive terminal $10_A$;

during or after the configuration BA!, a voltage may be sensed at the drive terminal $10_C$; and during or after the configuration CA!, a voltage may be sensed at the drive terminal $10_B$.

In one or more embodiments, the sequence of driving configurations applied to the motor M during an inductive sense procedure may be selected in order to reduce the amount of switching activity at the drive terminals. For instance, in the exemplified sequence CB!, AB!, AC!, BC!, BA!, CA!, the drive signal applied to one of the drive terminals is kept at the previous value at each commutation of the sequence, such as the drive terminal 10B being kept at the low value (e.g., 0 V) during the transition CB!→AB!, the drive terminal 10A being kept at the high value (e.g., VM) during the transition AB!→AC!, and so on.

In the context of the present description, the following designations will be used:

"XY! E_Toff" indicates the (voltage) signal sensed at a certain floating terminal due to transformer effect (i.e., due to mutual inductance effects as discussed previously) during the discharge phase (Toff) of a current flowing through the motor M, e.g., through the series of windings $L_X$ and $L_Y$, as a result of the motor M being driven in the XY! configuration (with XY corresponding to any possible pair of phases A, B, C, e.g., CB! or AB! or AC! or BC! or BA! or CA!); and "XY! E_Ton" indicates the (voltage) signal sensed at a certain floating phase due to transformer effect (i.e., due to mutual inductance effects) during the charge phase (Ton) of a current flowing through the motor M, e.g., through the series of windings LX and LY, as a result of the motor M being driven in the XY! configuration (with XY corresponding to any possible pair of phases A, B, C, e.g., CB! or AB! or AC! or BC! or BA! or CA!).

Signals XY! E_Toff and XY! E_Ton may be measured indifferently with respect to the voltage at the neutral point CT or the voltage at the reconstructed neutral point RCT. Thus, signals XY! E_Toff and XY! E_Ton may correspond to the signal PhX-sCT provided at the output of the differential circuit 34.

It is noted that signals of the type XY! E_Toff are sensed during the current discharge phase (or OFF phase) which follows the driving configuration XY!.

However, a driving signal in the form of a (voltage) pulse applied between terminals X and Y may be understood as comprising a first section, wherein the applied signal is different from zero (corresponding to the current charge phase or ON phase), and a second section, corresponding to the current discharge phase or OFF phase. Therefore, terminology such as "applying a drive signal between a pair of terminals" as used in the context of the present description, also with reference to the annexed claims, may comprise the case wherein such signal has a certain time behavior, e.g., having a first section wherein the applied signal has a certain first value (e.g., $V_M$), and a second section wherein the applied signal has a certain second value (e.g., 0 V).

For example, AB! E_Toff would indicate the (voltage) signal generated at a floating terminal $10_C$ due to transformer effect during the discharge phase of a current flowing between the drive terminals $10_A$ and $10_B$ (e.g., through the windings $L_A$ and $L_B$) as a result of the motor M being driven in the AB! configuration (e.g., with the drive terminal $10_A$ coupled to the motor voltage $V_M$ and the drive terminal $10_B$ coupled to ground).

Figure 4A:
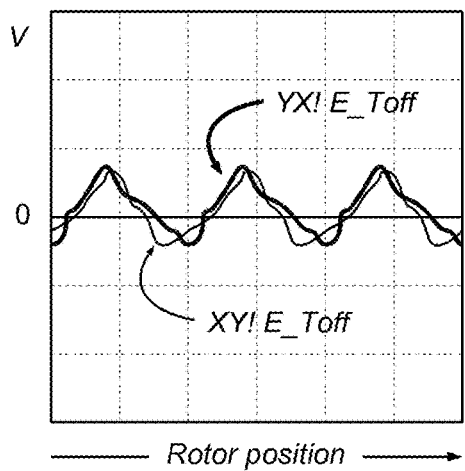
FIGS. 4A, 4B, 5A, 5B, 6A, 6B, 7A, 7B, 8A, 8B, 9A, 9B, 10, 11A, 11B, 12A, and 12B are diagrams exemplary of signals, according to one or more embodiments.
Figure 4B:
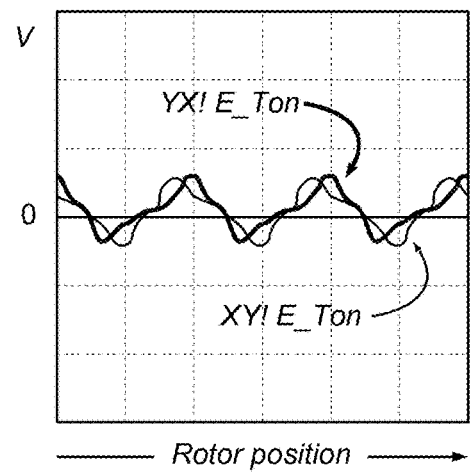

FIGS. 4A and 4B show two diagrams, respectively, that are exemplary of possible time behavior of signals, according to some embodiments.

In particular, FIG. 4A is exemplary of signals YX! E_Toff and XY! E_Toff as may be sensed as a result of the motor M being driven in the complementary phases YX! and XY!, respectively. FIG. 4B is exemplary of signals YX! E_Ton and XY! E_Ton.

Signals as exemplified in FIGS. 4A and 4B, may be generated by slowly varying the position of the rotor of the motor M so that the back electromotive forces generated across the motor windings are almost negligible. In particular, it will be appreciated that the signals in the diagrams of FIGS. 4A and 4B may be generated by varying the position of the rotor by about three electrical periods.

It will be noted that voltage signals as exemplified in FIGS. 4A and 4B may have a variable time behavior. The shape (form factor) of such signals may depend on the manufacture features and/or the operating conditions of the motor M.

Independently from such constructional and/or operating factors, signals as exemplified in FIGS. 4A and 4B may be periodical, with a period corresponding to an electrical period of the motor M. Therefore, such signals may cross a certain reference value (o V, in the case exemplified herein) at specific points, in particular twice per period.

A motor M generating signals YX! E_Toff, XY! E_Toff, YX! E_Ton, XY! E_Ton as exemplified in FIGS. 4A and 4B may not involve any sophisticated inductive sense method for detecting the position of the rotor. In such case, identifying the zero-cross events (i.e., the changes of polarity) of signals YX! E_Toff, XY! E_Toff, YX! E_Ton, XY! E_Ton may be sufficient for detecting/estimating the position of the rotor with satisfactory precision. For instance, document U.S. Pat. No. 8,040,095 B2 of the same Assignee discloses a mutual inductance sense method for execution during a start-up procedure of a BLDC motor based on detection of zero-cross events of signals sensed at the floating terminal(s), such as the signals YX! E_Toff, XY! E_Toff, YX! E_Ton, XY! E_Ton.

It is noted that reference to zero-cross events of the signals YX! E_Toff, XY! E_Toff, YX! E_Ton, XY! E_Ton (as well as other signals) may be used, in the context of the present description, since such signals are indicative of the voltage across respective motor windings, i.e., of the voltage measured at certain drive terminals with respect to the voltage of the neutral point (true, CT, or reconstructed, RCT). In other embodiments, zero-cross events may be replaced with generic level-cross events, e.g., in case the sensed signals are not referred to the neutral point, and the use of the term zero-cross events in the present description should be interpreted as comprising also level-cross events.

The inventors have noted that signals as exemplified in FIGS. 4A and 4B may be generated in a motor M as a result of the motor windings LA, LB, LC being well balanced, i.e., the windings having almost equal values of resistance and inductance (in absence of magnetic saturation effects). In fact, in such conditions the signals YX! E_Toff, XY! E_Toff, YX! E_Ton, XY! E_Ton may have a negligible offset with respect to the reference value (o V, in the case exemplified herein).

It is noted that good balance of the motor windings LA, LB, LC may be difficult to achieve, e.g., as a consequence of possible process variations during the fabrication process of the motor M, and/or possible inaccuracies during assembly of the motor M.

As a result of the motor windings LA, LB, LC being unbalanced, an offset signal may be generated at a floating phase of the motor M during an inductive sense procedure as described herein.

Figure 5A:
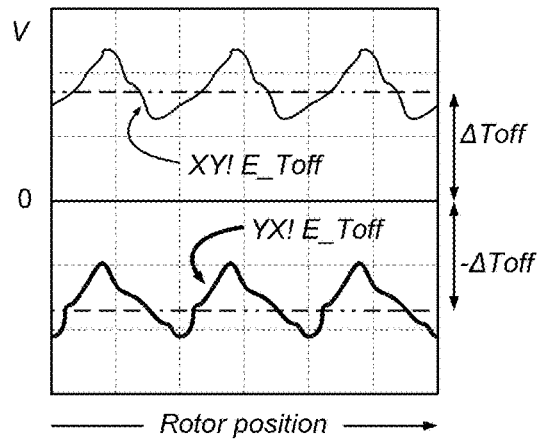
Figure 5B:
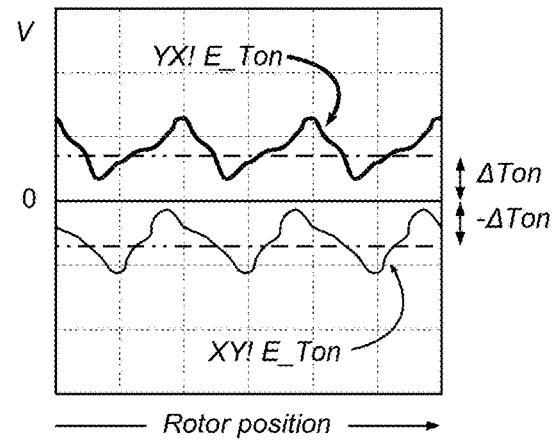

FIGS. 5A and 5B are exemplary of such a case, wherein the motor windings are unbalanced, thus resulting in a certain offset (voltage) signal which adds to the (voltage) signals YX! E_Toff, XY! E_Toff, YX! E_Ton, XY! E_Ton sensed at floating drive terminals.

In particular, it is noted that the offset $\Delta$Toff generated during the Toff phase at a certain floating terminal may be different from the offset $\Delta$Ton generated during the Ton phase at the same certain floating terminal.

The inventors also noted that the offset $\Delta$Toff affecting the signal XY! E_Toff may have about the same magnitude and opposite sign of the offset $-\Delta$Toff affecting the signal YX! E_Toff. Similarly, the offset $\Delta$Ton affecting the signal YX! E_Ton may have about the same magnitude and opposite sign of the offset $-\Delta$Ton affecting the signal XY! E_Ton.

Such phenomenon may be explained by the fact that signals XY! E_Toff and YX! E_Toff may be generated at a certain floating drive terminal by driving the same pair of drive terminals (X and Y) in a sort of complementary way (i.e., with the difference between the XY! configuration and the YX! configuration being the polarity of the voltage applied to the drive terminals 10X and 10Y). Therefore, also the offsets of signals XY! E_Toff and YX! E_Toff may be reversed with respect to each other.

Therefore, in embodiments wherein the motor windings LA, LB, LC are unbalanced, thus resulting in signals with non-negligible offset as exemplified in FIGS. 5A and 5B, a method as disclosed in document U.S. Pat. No. 8,040,095 B2 may not be suitable for detecting the position of the rotor of the motor M. In fact, such known method involves detecting zero-cross events of at least one of the signals YX! E_Toff, XY! E_Toff, YX! E_Ton, XY! E_Ton detected at floating terminals, with such signals possibly never crossing the reference level (e.g., 0 V) in the case of unbalanced motor windings.

One or more embodiments of the present description may thus provide an inductive sense method which facilitates detecting the rotor position in case of non-negligible offset of the signals YX! E_Toff, XY! E_Toff, YX! E_Ton, XY! E_Ton.

In particular, one or more embodiments may involve elaborating such sensed signals YX! E_Toff, XY! E_Toff, YX! E_Ton, XY! E_Ton in order to compensate and/or remove the offset added thereto.

Figure 6A:
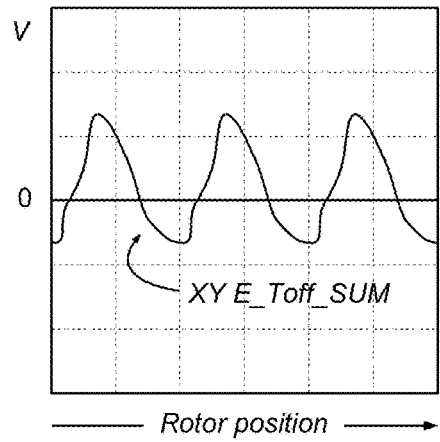
Figure 6B:
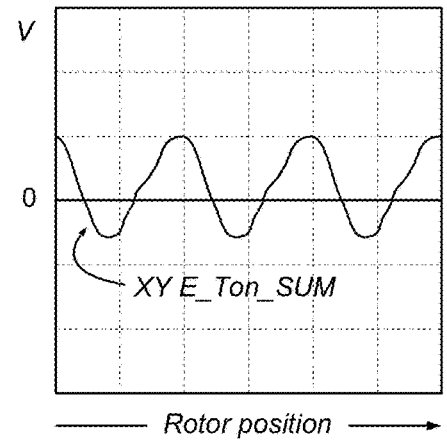

In one or more embodiments, a signal XY E_Toff_SUM as exemplified in FIG. 6A may be generated by adding up the signals YX! E_Toff and XY! E_Toff, and/or a signal XY E_Ton_SUM as exemplified in FIG. 6B may be generated by adding up the signals YX! E_Ton and XY! E_Ton:

$$XY\ E\_Toff\_SUM = YX!\ E\_Toff + XY!\ E\_Toff,$$

$$XY\ E\_Ton\_SUM = YX!\ E\_Ton + XY!\ E\_Ton.$$

In one or more embodiments, elaboration of signals YX! E_Toff, XY! E_Toff, YX! E_Ton, XY! E_Ton as indicated above may be implemented in a processing unit, e.g., a processing unit PU provided in the control circuit CTR.

The processing unit PU may comprise memory areas for storing values of the signals YX! E_Toff, XY! E_Toff, YX! E_Ton, XY! E_Ton during a certain excitation sequence of the stator windings. For instance, in the case of the exemplary sequence CB!, AB!, AC!, BC!, BA!, CA!, the values of the following signals may be stored: CB! E_Ton, CB! E_Toff, AB! E_Ton, AB! E_Toff, AC! E_Ton, AC! E_Toff, BC! E_Ton, BC! E_Toff, BA! E_Ton, BA! E_Toff, CA! E_Ton, CA! E_Toff.

The processing unit PU may thus be configured to perform sums amongst such stored signals as described above, and to store the signals XY E_Toff_SUM and/or XY E_Ton_SUM generated thereby.

As a result of the signals YX! E_Toff and XY! E_Toff having offsets with approximately the same magnitude and opposite sign, the signal XY E_Toff_SUM may have approximately zero offset, the same applying to the signal XY E_Ton_SUM for similar reasons.

Therefore, the signals XY E_Toff_SUM and XY E_Ton_SUM may have zero-cross events, and the position of the rotor may be detected/estimated by detecting such zero-cross events, with the estimation of the position of the rotor depending, for instance, on the polarity of the signals XY E_Toff_SUM and/or XY E_Ton_SUM.

The inventors have noted that signals XY E_Toff_SUM and XY E_Ton_SUM provide increased (voltage) peaks with respect to signals YX! E_Toff, XY! E_Toff, YX! E_Ton, XY! E_Ton. Therefore, signals XY E_Toff_SUM and XY E_Ton_SUM may additionally provide an improved signal-to-noise ratio (SNR) with respect to signals YX! E_Toff, XY! E_Toff, YX! E_Ton, XY! E_Ton, with such improved signal-to-noise ratio possibly further facilitating detection of zero-cross events in one or more embodiments.

Therefore, one or more embodiments may provide an inductive sense method for detecting the position of a rotor of a motor M by detecting zero-cross events and/or by detecting the polarity of signals XY E_Toff_SUM and/or XY E_Ton_SUM, thereby facilitating identification of the rotor position in case the motor windings are unbalanced.

Figure 7A:
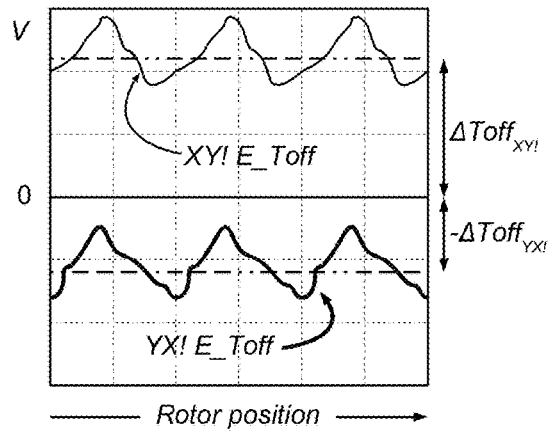
Figure 7B:
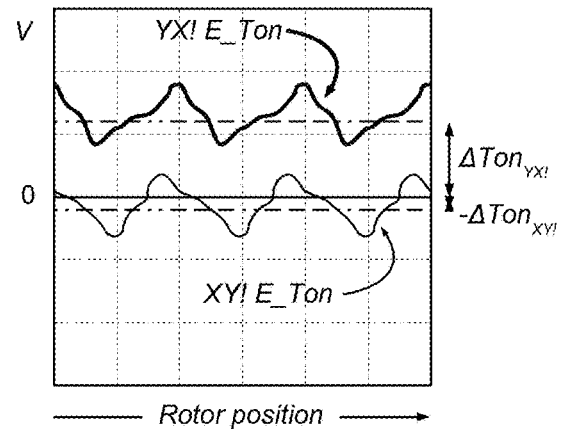

The inventors have noted that, in certain operating conditions of the motor M, additional offset(s) may add up to the signals YX! E_Toff, XY! E_Toff, YX! E_Ton, XY! E_Ton, as exemplified in FIGS. 7A and 7B.

Such additional offset(s) may be due, for instance, to a poor decoupling between the sensing circuit 32, 34 and the drive terminals $10_A$, $10_B$, $10_C$ and/or the node RCT.

For instance, in case the motor M does not provide a physical terminal for accessing the common node CT, or in case using such additional terminal is not cost-effective (e.g., because coupling of the sensing circuit to such additional terminal requires an additional electrical connection), a neutral point reconstruction circuit 30 may be used for providing at an output node RCT a (voltage) signal sCT indicative of the (voltage) signal at the common node CT.

As a result of the ohmic value of the resistors in the neutral point reconstruction circuit 30 being typically high (e.g., in the range between about 5 kΩ and about 30 kΩ), a good (current) decoupling between the node RCT and the other circuits coupled thereto, particularly the differential circuit 34, may be involved.

In case the decoupling between the node RCT and the other circuits coupled thereto is not optimal (e.g., in case some current leaks from node RCT to the input of the differential circuit 34), additional offset(s) may add to the signals YX! E_Toff, XY! E_Toff, YX! E_Ton, XY! E_Ton, as exemplified in FIGS. 7A and 7B.

In such case, it is noted that the overall offset $\Delta\text{Toff}_{XY}!$ (i.e., the sum of the offset due to the unbalanced motor windings and offset due to the bad decoupling of node RCT) affecting the signal XY! E_Toff may have opposite sign and different magnitude with respect to the offset $-\Delta\text{toff}_{YX}!$ affecting the signal YX! E_Toff.

Similarly, the offset $\Delta\text{Ton}_{YX}!$ affecting the signal YX! E_Ton may have opposite sign and different magnitude with respect to the offset $-\Delta\text{Ton}_{XY}!$ affecting the signal XY! E_Toff.

Such phenomenon may be explained by the fact that the additional offset(s), e.g., due to possible current leakage from node RCT, are not dependent on the polarity of the (voltage) signal applied to the drive terminals X and Y (i.e., the additional offset(s) may not be inverted by inverting the polarity of the excitation signal applied to the drive terminals X and Y).

Therefore, one or more embodiments involving detection of the zero-cross events and/or of the polarity of signals XY E_Toff_SUM and/or XY E_Ton_SUM for identifying the rotor position may not be suitable in case the reference node RCT and/or the drive terminals $10_A$, $10_B$, $10_C$ are not well decoupled from the sensing circuit coupled thereto.

Figure 8A:
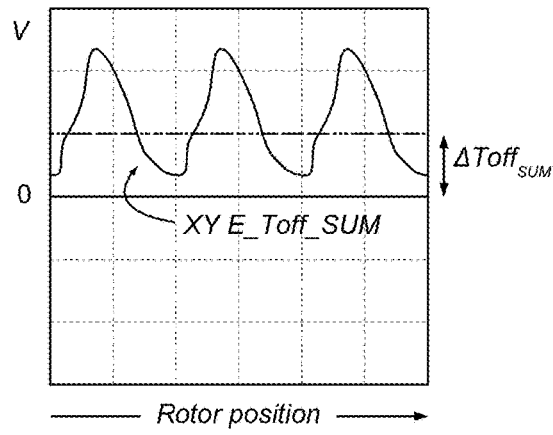
Figure 8B:
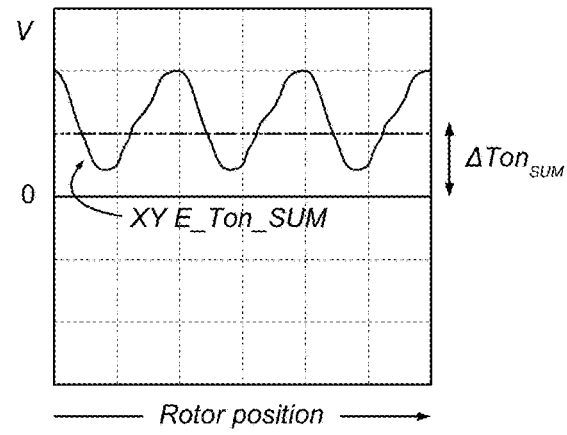

In fact, signals YX! E_Toff, XY! E_Toff, YX! E_Ton, XY! E_Ton as exemplified in FIGS. 7A and 7B may generate signals XY E_Toff_SUM and XY E_Ton_SUM as exemplified in FIGS. 8A and 8B, which may be still periodic (with a periodicity depending on the rotor angular position) but may be affected by certain respective offset(s) ΔToffSUM and ΔTonSUM. Therefore, signals XY E_Toff_SUM and/or XY E_Ton_SUM may not cross the reference value (e.g., 0 V) and may not generate any zero-cross events.

The inventors have noted that, in a case as exemplified in FIGS. 7A, 7B, 8A, and 8B, and discussed above, the signals XY E_Toff_SUM and XY E_Ton_SUM may have:

approximately the same offset, i.e., $\Delta\text{Toff}_{SUM} \approx \Delta\text{Ton}_{SUM}$, and approximately the same period, with a phase shift of about 180 degrees.

Therefore, in one or more embodiments the signals XY E_Toff_SUM and XY E_Ton_SUM may be elaborated (e.g., again in the processing unit PU) in order to generate at least one additional signal with compensated offset, such additional signal being suitable for rotor position estimation.

Figure 9A:
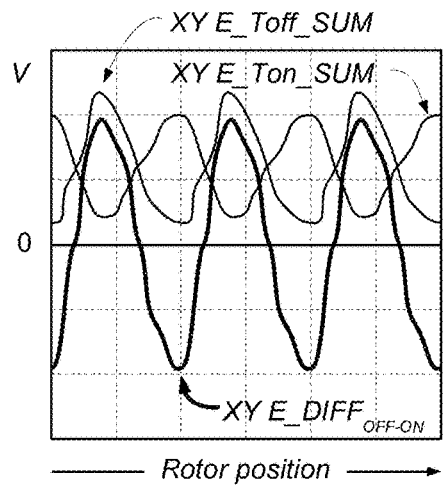
Figure 9B:
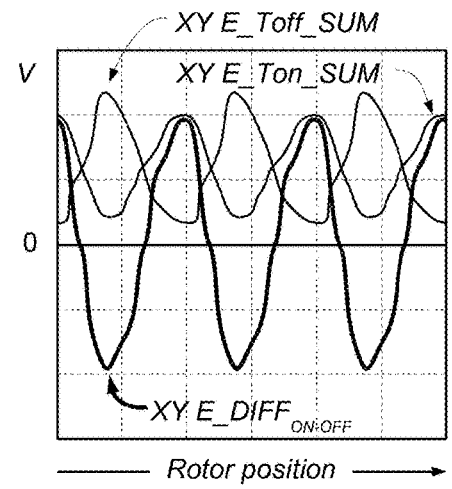

In one or more embodiments, a signal XY E_DIFF$_{OFF-ON}$ as exemplified in FIG. 9A may be generated by subtracting the signal XY E_Ton_SUM from the signal XY E_Toff_SUM, and/or a signal XY E_DIFF$_{ON-OFF}$ as exemplified in FIG. 9B may be generated by subtracting the signal XY E_Toff_SUM from the signal XY E_Ton_SUM:

$$XY\ E\_DIFF_{OFF-ON} = XY\ E\_Toff\_SUM - XY\ E\_Ton\_SUM,$$

$$XY\ E\_DIFF_{ON-OFF} = XY\ E\_Ton\_SUM - XY\ E\_Toff\_SUM.$$

Thus, in one or more embodiments a processing unit PU may be further configured to perform elaboration of signals XY E_Toff_SUM and XY E_Ton_SUM as indicated above, and store the resulting signals XY E_DIFF$_{OFF-ON}$ and/or XY E_DIFF$_{ON-OFF}$.

In one or more embodiments, signals XY E_DIFF$_{OFF-ON}$ and/or XY E_DIFF$_{ON-OFF}$ generated as discussed above may have:

periodic time behavior, with a period corresponding to the electrical period of the rotor M;

negligible or zero offset;

increased signal-to-noise ratio with respect to the signals XY E_Toff_SUM, XY E_Ton_SUM; and negligible voltage contributions due to possible back electromotive forces.

One or more embodiments may thus provide a method of identifying the position of a rotor in an electric motor M by detecting zero-cross events and/or polarity of a signal XY E_DIFF$_{OFF-ON}$ and/or a signal XY E_DIFF$_{ON-OFF}$, with such signals being almost insensitive to offsets due to possible unbalanced motor windings and/or possible poor decoupling between a the motor M and the sensing circuit coupled thereto.

It will be noted that reference has been made, throughout the present description, to one or more embodiments comprising driving a generic pair of drive terminals (or phases) X and Y of a motor M in two possible configurations XY! and YX!, with the voltage sensing performed at a third drive terminal of the motor M.

Driving a certain pair of drive terminals with voltage sensing performed at a certain third drive terminal may provide a possibility of determining the rotor position with a resolution of 180 degrees, as a result of signals as exemplified in FIGS. 6A, 6B, 7A, 7B, 8A, 8B, 9A and 9B crossing the reference value (e.g., 0 V) two times per period.

Figure 10:
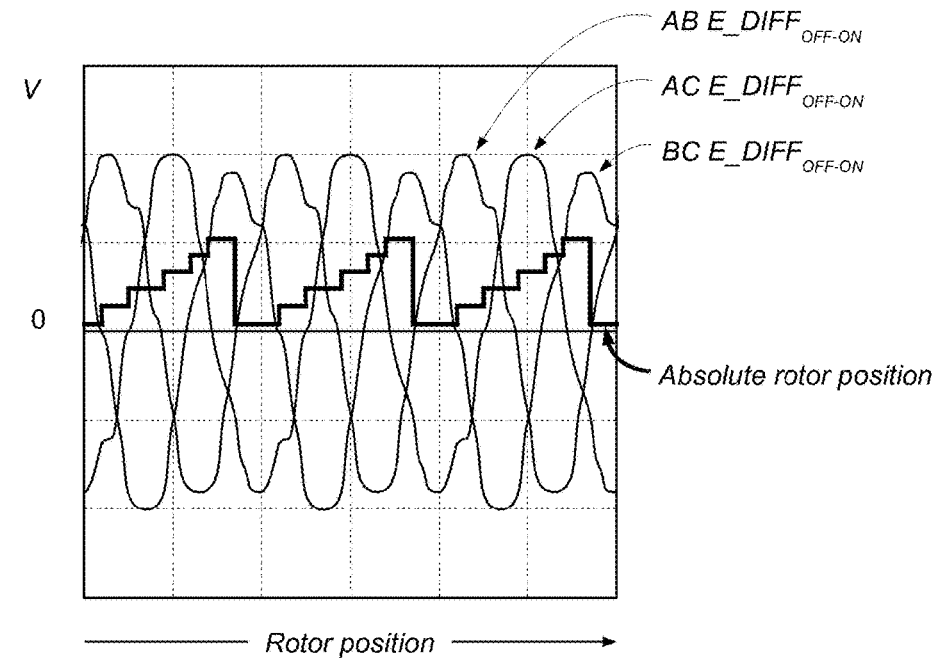

In one or more embodiments, a procedure as disclosed herein may be applied (periodically, i.e., at regular time intervals) to any possible pair of drive terminals, e.g., sensing voltage at a floating terminal during each of the drive configurations CB!, AB!, AC!, BC!, BA!, CA!, thereby generating signals AB E_DIFF$_{OFF-ON}$, AC E_DIFF$_{OFF-ON}$, BC E_DIFF$_{OFF-ON}$ as exemplified in FIG. 10 (and/or signals AB E_DIFF$_{ON-OFF}$, AC E_DIFF$_{ON-OFF}$, BC E_DIFF$_{ON-OFF}$, not visible in the annexed Figures).

In one or more embodiments as exemplified in FIG. 10, therefore, the rotor position may be estimated by detecting zero-cross events and/or by detecting the polarity of multiple signals of the type XY E_DIFF$_{OFF-ON}$ and/or XY E_DIFF$_{ON-OFF}$, which may result in the resolution of the absolute rotor position estimation being improved, e.g., reduced down to 60 degrees.

For instance, with reference to FIG. 10, a look-up table may be used to estimate the rotor position depending on the polarities of the signals AB E_DIFF$_{OFF-ON}$, AC E_DIFF$_{OFF-ON}$ and BC E_DIFF$_{OFF-ON}$. Such look-up table would associate, to each possible combination of polarities of signals AB E_DIFF$_{OFF-ON}$, AC E_DIFF$_{OFF-ON}$ and BC E_DIFF$_{OFF-ON}$, a certain absolute rotor position.

Additionally, the inventors have noted that the rotor positions which may be identified by applying an inductive sense procedure as disclosed in the present application are phase-shifted of 30 degrees with respect to rotor positions which may be detected by other inductive sense procedures known in the art, e.g., an inductive sense procedure based on sensing of a current rise-time T$_{rise}$.

Therefore, an inductive sense procedure as disclosed herein may be advantageous also in those cases wherein a known inductive sense procedure would be suitable for detecting the rotor position (e.g., cases wherein the motor windings are well balanced and/or a good decoupling is provided between the motor M and the sensing circuit).

Thus, in one or more embodiments, combining an inductive sense procedure as disclosed herein with an inductive sense procedure known in the art may result in improved resolution of the detectable rotor position, with such resolution possibly being reduced down to 30 degrees.

FIGS. 11A, 11B, 12A, and 12B provide an example of a comparison between two cases, a first case (FIGS. 11A and 12A) wherein the current flowing in the stator windings may be sensed with good accuracy (e.g., by using a current sensing circuit 386), and a second case (FIGS. 11B and 12B) wherein the current flowing in the stator windings may be sensed with lower accuracy (e.g., by using a current sensing transistor 382 and/or a set of low-side sensefets 384).

Figure 11A:
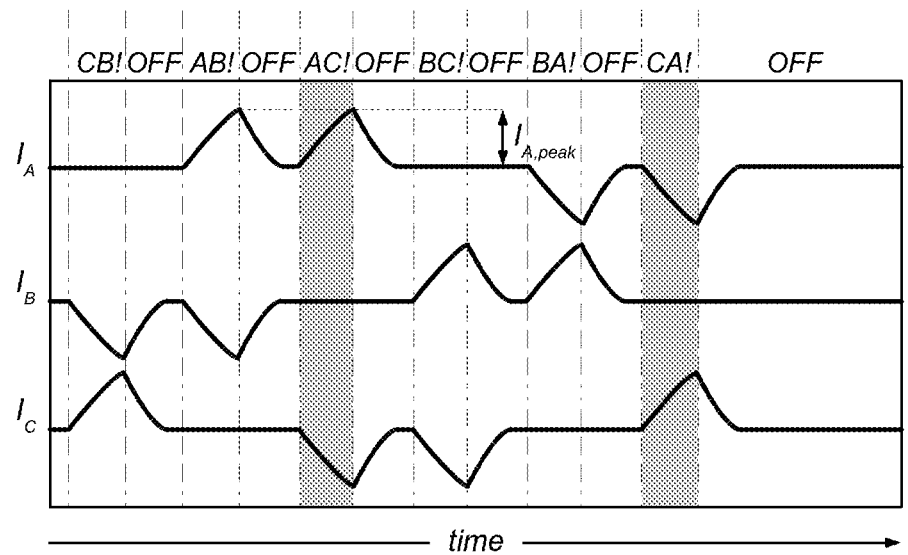
Figure 11B:
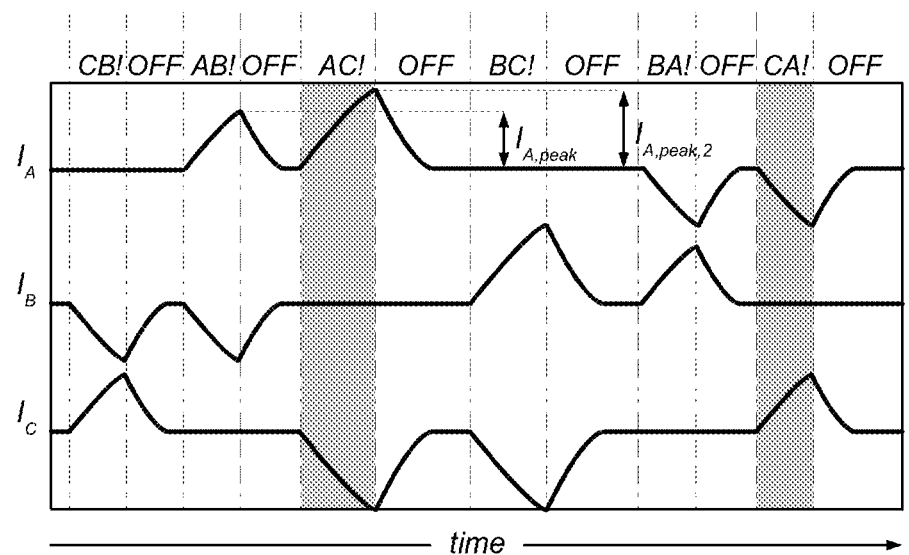

FIGS. 11A and 11B are exemplary of possible time behavior of current signals I$_A$, I$_B$, I$_C$ during an excitation sequence (CB!, AB!, AC!, BC!, BA!, CA!) of the stator windings in an inductive sense procedure. In FIG. 11A, the measured current peaks are similar one to another. In FIG. 11B, the measured current peaks (e.g., I$_{A,peak}$ and I$_{A,peak,2}$) have different magnitudes.

Figure 12A:
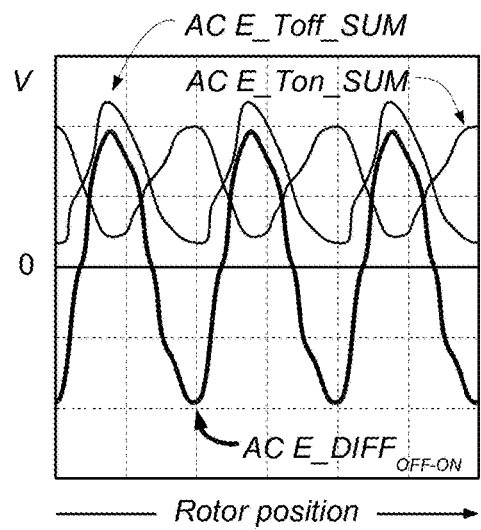
Figure 12B:
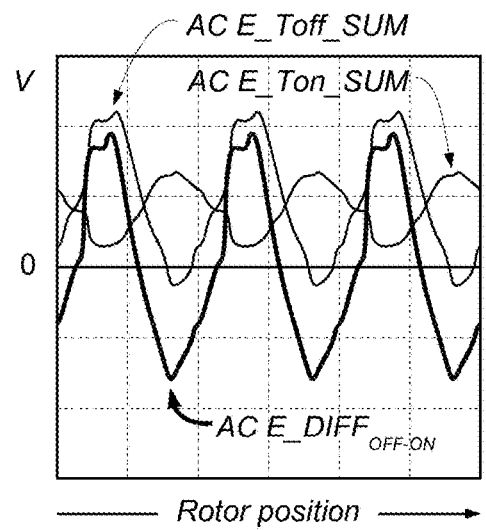

FIGS. 12A and 12B show examples of signals AC E_DIFF$_{OFF-ON}$ for the respective first and second case corresponding to FIGS. 11A and 11B. The choice of phases AC is by way of example only, and similar behavior may be observed also for phases AB and BC.

FIG. 11B is exemplary of a case wherein the rotor position may not be correctly determined by a known inductive sense method based on sensing rise-times of the current signals I$_A$, I$_B$, I$_C$. In fact, the rise time of the phase AC! may be, for instance, longer than the rise-time of the phase CA!, due to the measurement error generated by the current sensing circuit.

In conditions similar to those exemplified in FIG. 11B, one or more embodiments of the present description may provide a correct detection of the rotor position, as exemplified in FIG. 12B.

Therefore, one or more embodiments may provide a method of detecting the position of a rotor in an electric motor M with improved rejection to:
  unbalancing of motor windings,
  poor decoupling of the sensing circuit, and
  inaccurate sensing of the currents flowing in the motor windings.

As discussed previously, sensing of the current(s) flowing in the motor windings may not be performed at all in one or more embodiments, since it may be sufficient to generate current pulses in the stator windings according to a "constant pulse time" generation scheme.

One or more embodiments may thus provide reliable and affordable inductive sense methods, which do not require complex or sophisticated circuit (e.g., do not require good decoupling between the motor M and the sensing circuit) and/or additional components (e.g., a precise current sensing circuit 386 having an external resistor Rsense).

In one or more embodiments, cost-effective current sensing elements, such as a current sensing transistor 382 (e.g., an ISOFET Sensefet) and/or a set of low-side sensefets 384, may be used for sensing the motor currents IA, IB, IC without reducing the performance of an inductive sense method.

Alternatively, some embodiments may be even more cost-effective by avoiding use of any current sensing element.

FIGS. 13 to 17 are block diagrams exemplary of operation of various embodiments.

Figure 13:
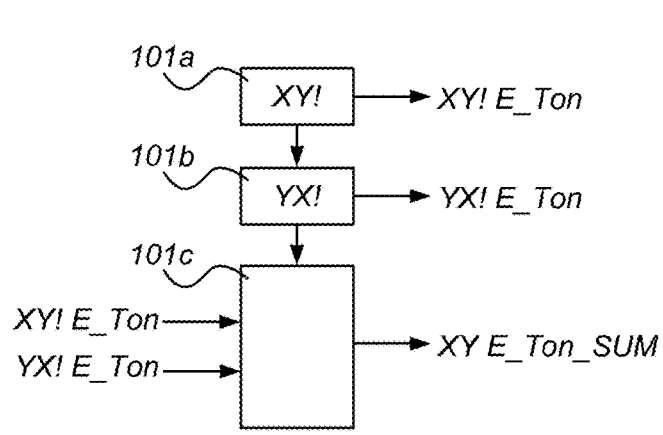
FIGS. 13 to 17 are block diagrams exemplary of possible operation of one or more embodiments.

In particular, FIG. 13 is a block diagram exemplary of an embodiment wherein:
  at a step 101a, a pair of drive terminals X and Y is driven in the XY! configuration, and a signal XY! E_Ton is sensed at a third drive terminal with a charge current flowing between terminals X and Y, and stored;
  at a step 101b, the pair of drive terminals X and Y is driven in the YX! configuration, and a signal YX! E_Ton is sensed at the third drive terminal with a charge current flowing between terminals Y and X, and stored; and
  at a step 101c, the stored signals XY! E_Ton and YX! E_Ton are summed to produce a signal XY E_Ton_SUM indicative of the position of the rotor (see, for instance, FIG. 6B).

Figure 14:
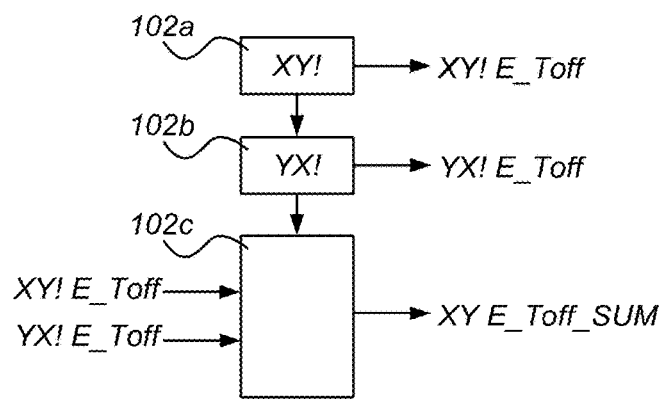

FIG. 14 is a block diagram exemplary of an embodiment wherein:
  at a step 102a, a pair of drive terminals X and Y is driven in the XY! configuration, and a signal XY! E_Toff is sensed at a third drive terminal with a discharge current flowing between terminals X and Y, and stored;
  at a step 102b, the pair of drive terminals X and Y is driven in the YX! configuration, and a signal YX! E_Toff is sensed at the third drive terminal with a discharge current flowing between terminals Y and X, and stored; and
  at a step 102c, the stored signals XY! E_Toff and YX! E_Toff are summed to produce a signal XY E_Toff_SUM indicative of the position of the rotor (see, for instance, FIG. 6A).

Figure 15:
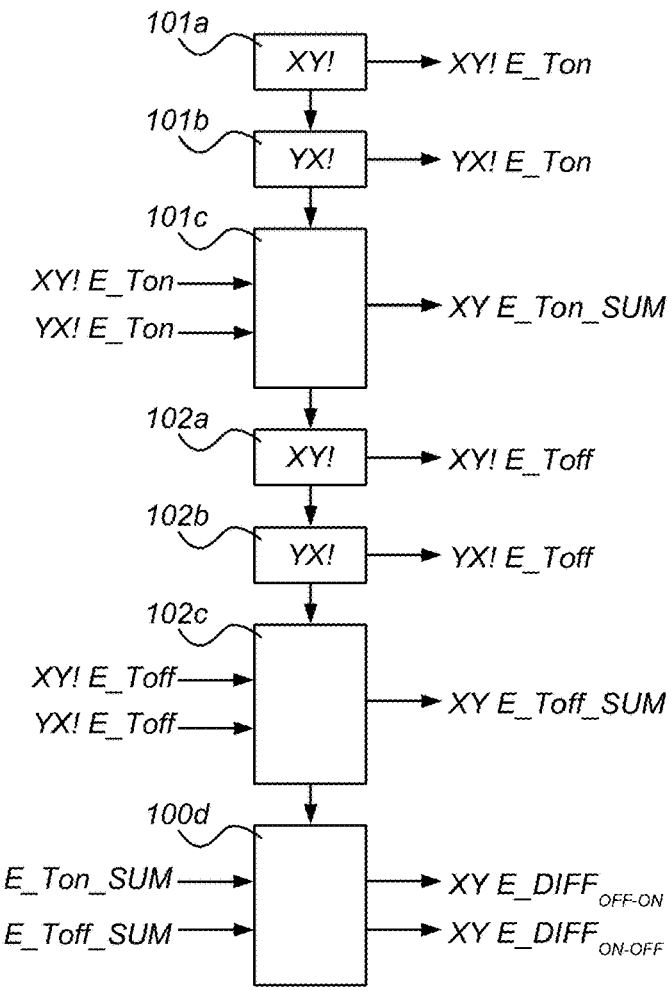

FIG. 15 is a block diagram exemplary of an embodiment wherein:
  steps 101a to 101c and 102a to 102c (as described with reference to FIGS. 13 and 14) are concatenated, thereby generating and storing signals XY E_Ton_SUM and XY E_Toff_SUM, and
  at a step 100d, stored signals XY E_Ton_SUM and XY E_Toff_SUM are subtracted from each other (in whatever order), thereby producing at least one difference signal (XY E_DIFF$_{OFF-ON}$ and/or XY E_DIFF$_{ON-OFF}$) indicative of the position of the rotor (see, for instance, FIGS. 9A and 9B).

Figure 16:
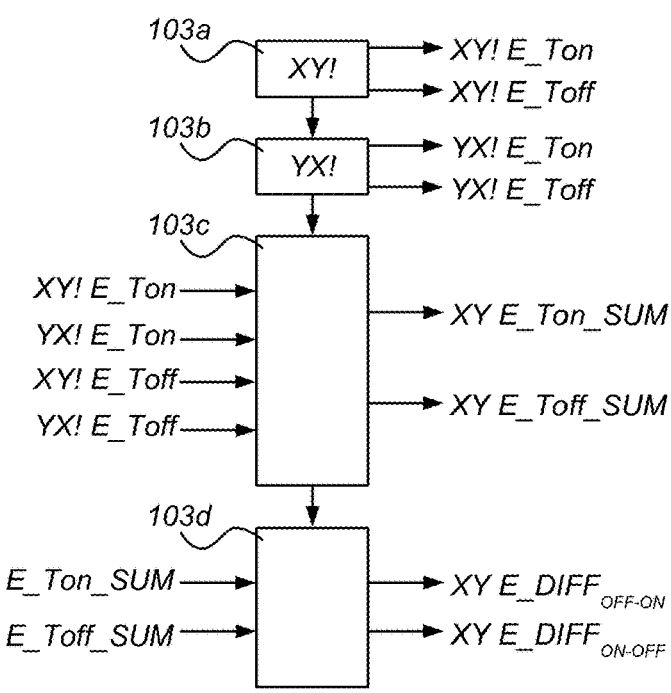
Figure 17:
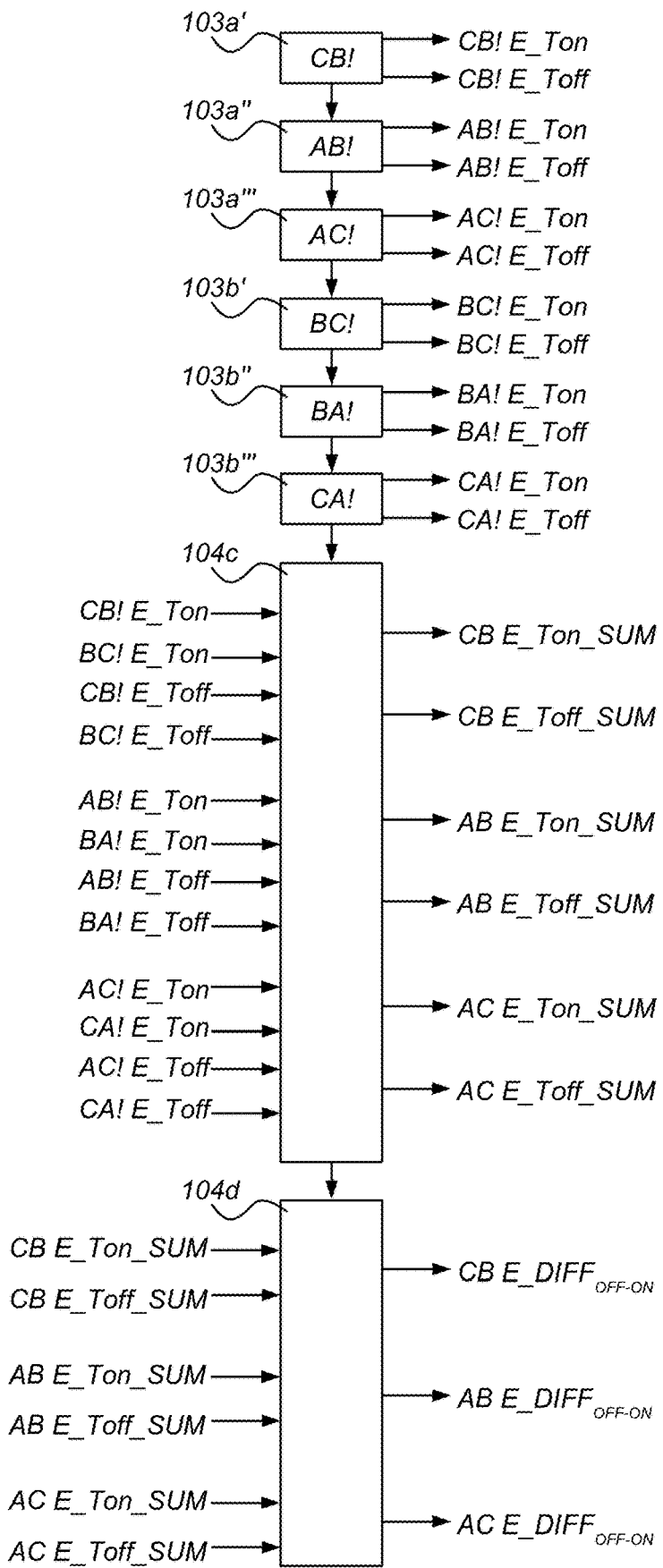

FIG. 16 is a block diagram exemplary of an embodiment wherein:
  at a step 103a, a pair of drive terminals X and Y is driven in the XY! configuration, a signal XY! E_Ton is sensed at a third drive terminal with a charge current flowing between terminals X and Y, and a signal XY! E_Toff is sensed at the third drive terminal with a discharge current flowing between terminals X and Y, and both signals are stored;

at a step 103b, the pair of drive terminals X and Y is driven in the YX! configuration, a signal YX! E_Ton is sensed at the third drive terminal with a charge current flowing between terminals Y and X, and a signal YX! E_Toff is sensed at the third drive terminal with a discharge current flowing between terminals Y and X, and both signals are stored;

at a step 103c, the stored signals XY! E_Ton and YX! E_Ton are summed to produce and store a signal XY E_Ton_SUM, and the stored signals XY! E_Toff and YX! E_Toff are summed to produce and store a signal XY E_Toff_SUM; and at a step 103d, stored signals XY E_Ton_SUM and XY E_Toff_SUM are subtracted from each other (in whatever order), thereby producing at least one difference signal (XY E_DIFF$_{OFF-ON}$ and/or XY E_DIFF$_{ON-OFF}$) indicative of the position of the rotor (see, for instance, FIGS. 9A and 9B).

FIG. 16 is a block diagram exemplary of an embodiment wherein:

steps 103a and 103b, (as described with reference to FIG. 15) are repeated for three possible choices of the first, second and third drive terminals, and interleaved in order to improve the excitation sequence of the motor M;

at a step 104c, the step 103c (as described with reference to FIG. 15) is repeated for three possible choices of the first, second and third drive terminals; and at a step 104d, the step 103d (as described with reference to FIG. 15) is repeated for three possible choices of the first, second and third drive terminals, thereby producing at least three difference signals (CB E_DIFF$_{OFF-ON}$, AB E_DIFF$_{OFF-ON}$ and AC E_DIFF$_{OFF-ON}$ or CB E_DIFF$_{ON-OFF}$, AB E_DIFF$_{ON-OFF}$ and AC E_DIFF$_{ON-OFF}$) indicative of the position of the rotor (see, for instance, FIG. 10), with the possibility of detecting the rotor position with a resolution of approximately 60 degrees.

Therefore, in one or more embodiments a method may comprise:

a) applying a drive signal with a first polarity between a first drive terminal (e.g., 10A) and a second drive terminal (e.g., 10C) in a set of drive terminals (e.g., 10A, 10B, 10C) coupled to respective stator windings (e.g., LA, LB, LC) in an electric motor (e.g., M) having a rotor and sensing at a third drive terminal (e.g., 10B) in the set of drive terminals at least one first signal (e.g., XY! E_Ton; XY! E_Toff) resulting from the application of the drive signal with the first polarity between the first drive terminal and the second drive terminal, b) applying a drive signal with a second polarity between the first drive terminal and the second drive terminal in the set of drive terminals, the second polarity opposite the first polarity, and sensing at the third drive terminal in the set of drive terminals at least one second signal (e.g., YX! E_Ton; YX! E_Toff) resulting from the application of the drive signal with the second polarity between the first drive terminal and the second drive terminal, and c) producing at least one sum signal (e.g., XY E_Ton_SUM; XY E_Toff_SUM) by summing the at least one first signal sensed and the at least one second signal sensed, wherein the at least one sum signal is indicative of an angular position of the rotor of the electric motor with respect to the stator windings thereof.

In one or more embodiments, sensing the at least one first signal at a third drive terminal in the set of drive terminals may comprise sensing at the third drive terminal in the set of drive terminals a first signal (e.g., XY! E_Ton) with a charge current flowing between the first drive terminal and the second drive terminal as a result of the application of the drive signal with the first polarity between the first drive terminal and the second drive terminal, and sensing the at least one second signal at a third drive terminal in the set of drive terminals may comprise sensing at the third drive terminal in the set of drive terminals a second signal (e.g., YX! E_Ton) with a charge current flowing between the first drive terminal and the second drive terminal as a result of the application of the drive signal with the second polarity between the first drive terminal and the second drive terminal, and producing the at least one sum signal (e.g., XY E_Ton_SUM) may comprise summing the first signal sensed and the second signal sensed, wherein the resulting sum signal is indicative of an angular position of the rotor of the electric motor with respect to the stator windings thereof.

In one or more embodiments, sensing the at least one first signal at a third drive terminal in the set of drive terminals may comprise sensing at the third drive terminal in the set of drive terminals a first signal (e.g., XY! E_Toff) with a discharge current flowing between the first drive terminal and the second drive terminal as a result of the application of the drive signal with the first polarity between the first drive terminal and the second drive terminal, and sensing at least one second signal at a third drive terminal in the set of drive terminals may comprise sensing at the third drive terminal in the set of drive terminals a second signal (e.g., YX! E_Toff) with a discharge current flowing between the first drive terminal and the second drive terminal as a result of the application of the drive signal with the second polarity between the first drive terminal and the second drive terminal, and producing the at least one sum signal (e.g., XY E_Toff_SUM) may comprise summing the first signal sensed and the second signal sensed, wherein the resulting sum signal is indicative of an angular position of the rotor of the electric motor with respect to the stator windings thereof.

One or more embodiments may comprise detecting the polarity of the at least one sum signal, wherein the polarity or the changes of polarity of the at least one sum signal may be indicative of an angular position of the rotor of the electric motor with respect to the stator windings thereof.

One or more embodiments may comprise:

performing the acts a) to c) with one of a charge current and a discharge current flowing between the first drive terminal and the second drive terminal and producing a first sum signal by summing the first signal sensed and the second signal sensed with one of a charge current and a discharge current flowing between the first drive terminal and the second drive terminal, performing the acts a) to c) with the other of a charge current and a discharge current flowing between the first drive terminal and the second drive terminal and producing a second sum signal by summing the first signal sensed and the second signal sensed with the other of a charge current and a discharge current flowing between the first drive terminal and the second drive terminal, producing a difference signal (e.g., XY E_DIFF$_{OFF-ON}$; XY E_DIFF$_{ON-Off}$) as a difference between the first sum signal and the second sum signal, and detecting the polarity of the difference signal, wherein the polarity or the changes of polarity of the difference signal is/are indicative of an angular position of the rotor of the electric motor with respect to the stator windings thereof.

One or more embodiments may comprise:

applying the drive signal with the first polarity between the first drive terminal and the second drive terminal in the set of drive terminals and performing the act a) both with a charge current and with a discharge current flowing between the first drive terminal and the second drive terminal, reversing the polarity of the drive signal by applying the drive signal with the second polarity between the first drive terminal and the second drive terminal in the set of drive terminals and performing the act b) both with a charge current and with a discharge current flowing between the first drive terminal and the second drive terminal.

One or more embodiments may comprise interleaving the acts a) and b) for a certain selection of a first, second and third drive terminals with at least one of the acts a) and b) for at least another selection of a first, second and third drive terminals, the at least another selection of a first, second and third drive terminals being different from the certain selection of a first, second and third drive terminals.

One or more embodiments may comprise selecting the at least another selection of a first, second and third drive terminals by maintaining the signal level of one of the first and second drive terminals in the certain selection of a first, second and third drive terminals.

In one or more embodiments, the set of drive terminals comprises three drive terminals.

In one or more embodiments, a rotor position detecting circuit for cooperation with an electric motor having a set of drive terminals coupled to respective motor windings may comprise:

a driver circuit (e.g., 38) configured to be coupled to the drive terminals of the electric motor for providing thereto respective drive signals for operation of the electric motor, a sensing circuit (e.g., 32, 34, 36) configured to selectively sense signals at the drive terminals, and a control circuit (e.g., CTR) configured to control operation of the driver circuit and of the sensing circuit according to the method of one or more embodiments.

In one or more embodiments, an electric motor having a set of drive terminals coupled to respective motor windings may be equipped with a rotor position detecting circuit according to one or more embodiments.

Without prejudice to the underlying principles, the details and embodiments may vary, even significantly, with respect to what has been described by way of example only, without departing from the extent of protection.

The extent of protection is defined by the annexed claims.

What is claimed is:

1. A method comprising:
a) applying a first drive signal with a first polarity between a first and a second drive terminals of a set of drive terminals, wherein each drive terminal of the set of drive terminals is coupled to respective stator windings of an electric motor, and sensing, at a third drive terminal of the set of drive terminals, a first signal resulting from the application of the first drive signal;
b) applying a second drive signal with a second polarity between the first drive terminal and the second drive terminal, wherein the second polarity is opposite the first polarity, and sensing, at the third drive terminal, a second signal resulting from the application of the second drive signal; and
c) producing a sum signal by summing the first and second signals, wherein the sum signal is indicative of an angular position of a rotor of the electric motor with respect to the stator windings.

2. The method of claim 1, wherein:
sensing the first signal comprises sensing the first signal during a first charge phase, wherein, during the first charge phase, a charge current flows between the first and second drive terminals as a result of the application of the first drive signal; and
sensing the second signal comprises sensing the second signal during a second charge phase, wherein, during the second charge phase, a charge current flows between the first and second drive terminals as a result of the application of the second drive signal.

3. The method of claim 1, wherein:
sensing the first signal comprises sensing the first signal during a first discharge phase, wherein, during the first discharge phase, a discharge current flows between the first and second drive terminals as a result of the application of the first drive signal; and
sensing the second signal comprises sensing the second signal during a second discharge phase, wherein, during the second discharge phase, a discharge current flows between the first and second drive terminals as a result of the application of the second drive signal.

4. The method of claim 1, further comprising detecting a polarity of the sum signal, wherein the polarity or a change of polarity of the sum signal is indicative of an angular position of the rotor with respect to the stator windings.

5. The method of claim 1, further comprising:
performing the acts a) to c) with one of a charge current or a discharge current flowing between the first drive terminal and the second drive terminal, and producing the sum signal as a first sum signal by summing the first signal sensed and the second signal sensed with one of a charge current or a discharge current flowing between the first and second drive terminals;
performing the acts a) to c) with the other of the charge current and the discharge current flowing between the first and second drive terminals and producing the sum signal as a second sum signal by summing the first signal sensed and the second signal sensed with the other of the charge current and the discharge current flowing between the first and second drive terminals;
producing a difference signal as a difference between the first sum signal and the second sum signal; and
detecting a polarity of the difference signal, wherein the polarity or change of polarity of the difference signal is indicative of an angular position of the rotor with respect to the stator windings.

6. The method of claim 5, comprising:
applying the first drive signal and performing the act a) with both a charge current and with a discharge current flowing between the first and second drive terminals; and
reversing the polarity of the first drive signal by applying the second drive signal with the second polarity between the first and second drive terminals and performing the act b) both with a charge current and with a discharge current flowing between the first and second drive terminals.

7. The method of claim 1, comprising interleaving the acts a) and b) for a certain selection of first, second, and third drive terminals with one of the acts a) or b) for another selection of first, second, and third drive terminals, the another selection of the first, second, and third drive terminals being different from the certain selection of the first, second, and third drive terminals.

8. The method of claim 7, comprising selecting the another selection of a first, second, and third drive terminals by maintaining a signal level of one of the first or second drive terminals in the certain selection of the first, second, and third drive terminals.

9. The method of claim 1, wherein the set of drive terminals comprises three drive terminals.

10. A rotor position detecting circuit for cooperation with an electric motor having a set of drive terminals coupled to respective motor windings, the rotor position detecting circuit comprising:
a driver circuit configured to be coupled to the set of drive terminals of the electric motor for providing respective drive signals for operation of the electric motor;
a sensing circuit configured to selectively sense signals at drive terminals of the set of drive terminals; and
a control circuit configured to control operation of the driver circuit and of the sensing circuit to:
cause application of a first drive signal with a first polarity between first and second drive terminals of a set of drive terminals,
cause sensing, at a third drive terminal of the set of drive terminals, of a first signal resulting from the application of the first drive signal,
cause application of a second drive signal with a second polarity between the first and second drive terminals, wherein the second polarity is opposite the first polarity,
cause sensing, at the third drive terminal, of a second signal resulting from the application of the second drive signal, and
produce a sum signal by summing the first and second signals, wherein the sum signal is indicative of an angular position of a rotor of the electric motor with respect to the motor windings.

11. The rotor position detecting circuit of claim 10, wherein the control circuit is configured to:
cause sensing of the first signal during a first charge phase, wherein a charge current flows between the first and second drive terminals as a result of the application of the first drive signal during the first charge phase; and
cause sensing of the second signal during a second charge phase, wherein a charge current flows between the first and second drive terminals as a result of the application of the second drive signal during the second charge phase.

12. The rotor position detecting circuit of claim 10, wherein the control circuit is configured to:
cause sensing of the first signal during a first discharge phase, wherein a discharge current flows between the first and second drive terminals as a result of the application of the first drive signal during the first discharge phase; and
cause sensing of the second signal during a second discharge phase, wherein a discharge current flows between the first and second drive terminals as a result of the application of the second drive signal during the second discharge phase.

13. The rotor position detecting circuit of claim 10, wherein the control circuit is configured to:
cause sensing of the first signal during one of a first charge or discharge phase, wherein a charge current flows between the first and second drive terminals as a result of the application of the first drive signal during the first charge phase, and wherein a discharge current flows between the first and second drive terminals as a result of the application of the first drive signal during the first discharge phase;
cause sensing of the second signal during a second charge or discharge phase, wherein a charge current flows between the first and second drive terminals as a result of the application of the second drive signal during the second charge phase, and wherein a discharge current flows between the first and second drive terminals as a result of the application of the second drive signal during the second discharge phase;
cause sensing of a third signal during the other of the first charge or discharge phase;
cause sensing of a fourth signal during the other of the second charge or discharge phase;
produce a second sum signal by summing the third and fourth signals;
produce a difference signal as a difference between the sum signal and the second sum signal; and
detect a polarity of the difference signal, wherein the polarity or change of polarity of the difference signal is indicative of an angular position of the rotor with respect to the motor windings.

14. The rotor position detecting circuit of claim 10, further comprising:
a neutral point reconstruction circuit configured to be coupled to the set of drive terminals of the electric motor; and
an operational amplifier having a first input coupled to an output of the neutral point reconstruction circuit, wherein the control circuit is configured to control operation of the driver circuit and of the sensing circuit based on an output of the operations amplifier.

15. The rotor position detecting circuit of claim 14, further comprising:
a multiplexer coupled between the neutral point reconstruction circuit and a second input of the operational amplifier; and
an analog-to-digital converter coupled between the output of the operations amplifier and the control circuit.

16. The rotor position detecting circuit of claim 10, further comprising a current sensing circuit coupled to the driver circuit, wherein the current sensing circuit comprises a current sensing transistor or a sensing resistor.

17. The rotor position detecting circuit of claim 10, wherein the driver circuit comprises a current sense transistor configured to sense a current flowing between the first and second drive terminals.

18. An electric motor comprising:
a set of drive terminals coupled to respective motor windings; and
a rotor position detecting circuit comprising:
a driver circuit coupled to the set of drive terminals of the electric motor for providing respective drive signals for operation of the electric motor;
a sensing circuit configured to selectively sense signals at drive terminals of the set of drive terminals; and
a control circuit configured to control operation of the driver circuit and of the sensing circuit to:
cause application of a first drive signal with a first polarity between first and second drive terminals of a set of drive terminals,
cause sensing, at a third drive terminal of the set of drive terminals, of a first signal resulting from the application of the first drive signal,
cause application of a second drive signal with a second polarity between the first and second drive terminals, wherein the second polarity is opposite the first polarity,
cause sensing, at the third drive terminal, of a second signal resulting from the application of the second drive signal, and
produce a sum signal by summing the first and second signals, wherein the sum signal is indicative of an angular position of a rotor of the electric motor with respect to the motor windings.

19. The electric motor of claim 18, wherein the control circuit is configured to:
- cause sensing of the first signal during a first charge phase, wherein a charge current flows between the first and second drive terminals as a result of the application of the first drive signal during the first charge phase; and
- cause sensing of the second signal during a second charge phase, wherein a charge current flows between the first and second drive terminals as a result of the application of the second drive signal during the second charge phase.

20. The electric motor of claim 18, wherein the rotor position detecting circuit further comprises:
- a neutral point reconstruction circuit coupled to the set of drive terminals;
- an operational amplifier having a first input coupled to an output of the neutral point reconstruction circuit;
- a multiplexer coupled between the neutral point reconstruction circuit and a second input of the operational amplifier; and
- an analog-to-digital converter coupled between an output of the operations amplifier and the control circuit, wherein the control circuit is configured to control operation of the driver circuit and of the sensing circuit based on an output of the analog-to-digital converter.

* * * * *